(12) United States Patent
Strait

(10) Patent No.: US 8,055,753 B2
(45) Date of Patent: Nov. 8, 2011

(54) PEER TO PEER JOB MONITORING AND CONTROL IN GRID COMPUTING SYSTEMS

(75) Inventor: Gary E. Strait, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1784 days.

(21) Appl. No.: 10/458,956

(22) Filed: Jun. 11, 2003

(65) Prior Publication Data

US 2005/0015437 A1   Jan. 20, 2005

(51) Int. Cl.
*G06F 15/16* (2006.01)

(52) U.S. Cl. ........... 709/224; 709/220; 709/228; 707/10

(58) Field of Classification Search .................... 717/10; 709/220, 223, 227, 228, 224, 226, 229; 702/186
See application file for complete search history.

(56) References Cited

U.S. PATENT DOCUMENTS

| | | | |
|---|---|---|---|
| 5,898,834 A * | 4/1999 | Sharpe et al. | 709/201 |
| 5,968,116 A | 10/1999 | Day, III et al. | |
| 6,169,735 B1 | 1/2001 | Allen, Jr. et al. | |
| 6,363,422 B1 * | 3/2002 | Hunter et al. | 709/224 |
| 6,510,462 B2 * | 1/2003 | Blumenau | 709/224 |
| 6,584,507 B1 * | 6/2003 | Bradley et al. | 709/229 |
| 6,795,407 B2 | 9/2004 | Chesson | |
| 6,847,184 B2 | 1/2005 | Noguchi et al. | |
| 6,871,211 B2 * | 3/2005 | Labounty et al. | 709/203 |
| 6,918,113 B2 * | 7/2005 | Patel et al. | 717/178 |
| 7,188,151 B2 * | 3/2007 | Kumar et al. | 709/217 |
| 7,260,596 B1 * | 8/2007 | Zhou | 709/200 |
| 7,356,736 B2 * | 4/2008 | Natvig | 714/38 |
| 7,546,353 B2 * | 6/2009 | Hesselink et al. | 709/216 |
| 2002/0143923 A1 * | 10/2002 | Alexander | 709/223 |
| 2003/0046385 A1 * | 3/2003 | Vincent | 709/224 |
| 2003/0084341 A1 * | 5/2003 | Ramachandran et al. | 713/201 |
| 2003/0217106 A1 * | 11/2003 | Adar et al. | 709/206 |
| 2004/0044776 A1 * | 3/2004 | Larkin | 709/228 |

FOREIGN PATENT DOCUMENTS

| | | | |
|---|---|---|---|
| CN | 1265545 A | | 9/2000 |
| JP | 1217562 A | | 8/1989 |
| TW | 454398 B | | 9/2001 |
| TW | 455780 B | | 9/2001 |
| TW | 512603 B | | 12/2002 |

* cited by examiner

*Primary Examiner* — Khanh Q Dinh
(74) *Attorney, Agent, or Firm* — William A. Kinnaman, Jr.

(57) ABSTRACT

A solution for improved monitoring and control of jobs in grid and batch computing systems provides a centralized server's batch manager which is only responsible for workload balancing and job initiation and completion, all other command and status information are communicated directly between the plurality of submitter's systems and the plurality of client systems that are processing their respective workloads. The computing system and communication process utilizes event-driven peer to peer communications between submitter's systems and client systems and enables more detailed status and control information to be passed without overloading the centralized server, and by avoiding polling also provides more immediate feedback of results. Multiple process threads are employed on both the submitter's and client systems, and a user interface consolidates and displays results to the submitter allow commands to be sent to processes running on client batch systems.

11 Claims, 9 Drawing Sheets

```
1   # @ executable = /home/submitter/bin/runsim
2   # @ requirements = (Memory >= 512) && (OpSys >= "AIX432") && (Speed >= 4.00)
3   # @ preferences = (Feature != "keyboard")
4   # @ output = /home/submitter/log/step1.log
5   # @ error = /home/submitter/log/step1.log
6   # @ arguments = psim 'jobname(step1) uparms(tcfg=sim) running_in_batch(Y) buffout(y)'
7   # @ initialdir = /home/submitter/run
8   # @ shell = /bin/ksh
9   # @ class = simulation
10  # @ notification = NEVER
11  # @ queue
12  # @ executable = /home/submitter/bin/runsim
13  # @ requirements = (Memory >= 512) && (OpSys >= "AIX432") && (Speed >= 4.00)
14  # @ preferences = (Feature != "keyboard")
15  # @ output = /home/submitter/log/step2.log
16  # @ error = /home/submitter/log/step2.log
17  # @ arguments = psim 'jobname(step2) uparms(tcfg=sim) running_in_batch(Y) buffout(y)'
18  # @ initialdir = /home/submitter/run
19  # @ shell = /bin/ksh
20  # @ class = simulation
21  # @ notification = NEVER
22  # @ queue
```

FIGURE 4.

```
1   # @ executable = /home/submitter/bin/runsim
2   # @ requirements = (Memory >= 512) && (OpSys >= "AIX432") && (Speed >= 4.00)
3   # @ preferences = (Feature != "keyboard")
4   # @ output = /home/submitter/log/step1.log
5   # @ error = /home/submitter/log/step1.log
6   # @ arguments = llsim client2.com 49163 key0 psim 'jobname(step1) uparms(tcfg=sim) running_in_batch(Y) buffout(y)'
7   # @ initialdir = /home/submitter/run
8   # @ shell = /bin/ksh
9   # @ class = simulation
10  # @ notification = NEVER
11  # @ queue
12  # @ executable = /home/submitter/bin/runsim
13  # @ requirements = (Memory >= 512) && (OpSys >= "AIX432") && (Speed >= 4.00)
14  # @ preferences = (Feature != "keyboard")
15  # @ output = /home/submitter/log/step2.log
16  # @ error = /home/submitter/log/step2.log
17  # @ arguments = llsim client2.com 49163 key0 psim 'jobname(step2) uparms(tcfg=sim) running_in_batch(Y) buffout(y)'
18  # @ initialdir = /home/submitter/run
19  # @ shell = /bin/ksh
20  # @ class = simulation
21  # @ notification = NEVER
22  # @ queue
```

With callouts 46, 47, 48, 49 pointing to portions of line 6.

FIGURE 5.

PEER TO PEER JOB MONITORING AND CONTROL IN GRID COMPUTING SYSTEMS

FIELD OF THE INVENTION

This invention relates to the fields of parallel processing, batch processing, and grid computing, and particularly to applications where the submitter of batch jobs needs to interact with batch jobs during their execution. The disclosed implementation provides for improved communication and feedback between the originator of jobs and the client systems processing those jobs, such that the submitter is able to receive real time feedback on job progress, and to send real-time commands to alter the continued operation of said jobs.

The invention particularly is directed to applications where the submitter of batch jobs needs to interact with batch jobs during their execution.

Trademarks: IBM® is a registered trademark of International Business Machines Corporation, Armonk, N.Y., U.S.A. Other names may be registered trademarks or product names of International Business Machines Corporation or other companies.

BACKGROUND

Batch processing and parallel processing systems have existed for many years. These typically can be used to submit single jobs for processing, for multiple independent jobs, or for a set of related jobs that may comprise sub-steps of a larger job. IBM's LoadLeveler is an example of such a system, and Grid Computing is a new field that builds on what was provided with LoadLeveler, extending it with flexibility and security for use in more diverse environments.

A typical implementation of a parallel processing system allows multiple clients to each submit multiple job steps to be distributed among a pool of clients for processing. This is typically accomplished by having a centralized server receive all such requests, and prioritize and distribute them to a pool of client systems for processing. The centralized server is responsible for workload balancing among the clients, and for the commands to the client systems necessary to start and maintain jobs, and for monitoring activity and notifying the submitter of status, such as completion of the job steps on each client.

In these typical applications, once a job step is initiated on a client system for processing, all communication must flow through the centralized server, and there is little communication with or feedback of results from the job steps to the submitter prior to completion of the job step. This arises from several practical limitations. Due to the fact that the centralized server may be handling many job steps for many submitters simultaneously, and the centralized server is typically a general-purpose server not customized to a specific application, the centralized server does not have the capability or capacity to deal with the particular actions and requirements of each job step on each processing client in real time.

SUMMARY OF THE INVENTION

In the disclosed invention, a centralized server as previously used for dispatch and management of batch jobs remains unmodified, as in prior art. However, this invention's preferred embodiment provides for improved communication and feedback between the originator of jobs and the client systems processing those jobs, such that the submitter is able to receive real time feedback on job progress, and to send real-time commands to alter the continued operation of said jobs. In accordance with the invention's preferred embodiment the submitter application of batch jobs applications allows interacting with batch jobs during their execution. In this invention software layers are added at each submitter's system and at each batch client where a job step is processed. These additional software layers utilize pipelines and communication protocols (such as TCP/IP sockets) to enable direct communication between the submitter's system and each job step on the respective processing client. These additional software layers are under control of the job submitter application, and may be modified if necessary to support specific requirements of the submitter's workload, with no modification to the centralized batch manager. These additional software layers utilize peer to peer communication between the submitter's system and each batch processing client, permitting communication directly between the submitter's client system and each processing client, without use of a communications channel through the centralized batch manager.

These and other improvements are set forth in the following detailed description. For a better understanding of the invention with advantages and features, refer to the description and to the drawings.

DESCRIPTION OF THE DRAWINGS

FIG. 4 illustrates an unmodified job control file for submitting a multi-step job.

FIG. 5 illustrates a job control file modified to insert invocation of additional communication processes for each step of a multi-step job.

Our detailed description explains the preferred embodiments of our invention, together with advantages and features, by way of example with reference to the drawings.

DETAILED DESCRIPTION OF THE INVENTION

Figure 1:
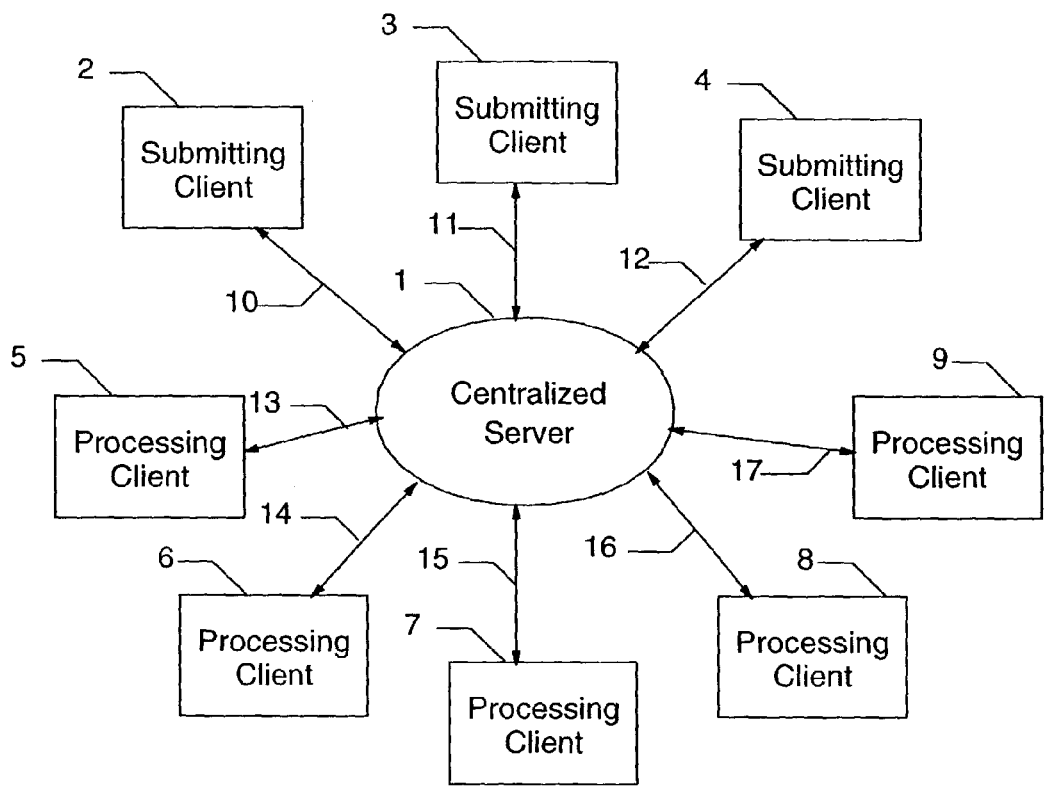
FIG. 1 illustrates connections between a centralized server and submitting systems and processing systems, both of which may be considered clients of the centralized server.

FIG. 1 illustrates a typical system for distributing a workload from a plurality of submitters to a multitude of clients for processing. Typically there is a centralized server 1 to which all requests are made, and from which all clients receive requests for processing. Clients are often capable of being submitters or processors, and may switch from one role to the other, or even act as both submitters and processors at the same time. For the example shown, clients 2, 3, and 4 will function as submitters, and clients 5, 6, 7, 8, and 9 will provide processing services. The communications structure shown, consisting of links 10, 11, 12, 13, 14, 15, 16, and 17 are used by the clients for communication with the centralized server 1. These communication links are utilized by the submitters 2, 3, and 4 to make requests for processing services, and for the centralized server 1 to dispatch processing requests to clients 5, 6, 7, 8, and 9, and for the centralized server to monitor the status and progress of all the clients. Centralized server 1 may also provide some feedback to submitting clients 2, 3, and 4, for example notification of completion of processing and the return of final results, if not returned via another mechanism, such as a shared file storage system. This communications structure remains unchanged for the present invention, and continues to fulfill these roles, and centralized server 1 continues to fill the important role of workload balancing among the clients.

Figure 2:
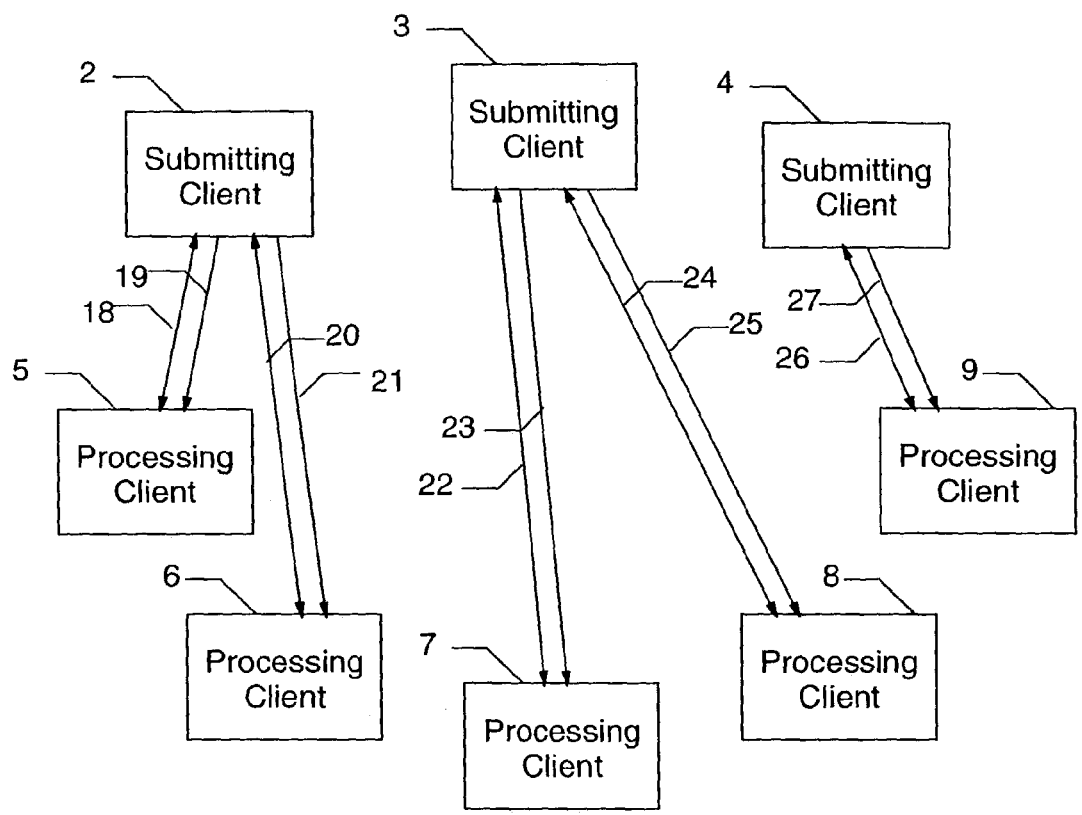
FIG. 2 illustrates direct peer to peer connections between submitting and processing clients.

FIG. 2 illustrates additional communication paths opened by the subject invention for communication between clients (these communication paths are in addition to the paths in FIG. 1, but are shown separately for clarity). These communication paths are established by the clients, with no participation by the centralized server 1 shown in FIG. 1. For the examples shown, it will be assumed that client 2 has made a request for processing services, and that this request has been assigned by server 1 to be performed on clients 5 and 6. It will further be assumed that client 3 has made a request for processing services, and that this request has been assigned by server 1 to be performed on clients 7 and 8. It will further be assumed that client 4 has made a request for processing services, and that this request has been assigned by server 1 to be performed on client 9.

As said requests are distributed for processing, the communication paths shown in FIG. 2 will be established by the clients. Communication paths 18 and 19 will be opened between clients 2 and 5, as shown. Communication paths 20 and 21 will be opened between clients 2 and 6, as shown. Similarly, communication paths 22, 23, 24, 25, 26, and 27 will be opened between the remaining submitting clients and processing clients, as shown, corresponding to the job step distribution described previously.

Figure 3:
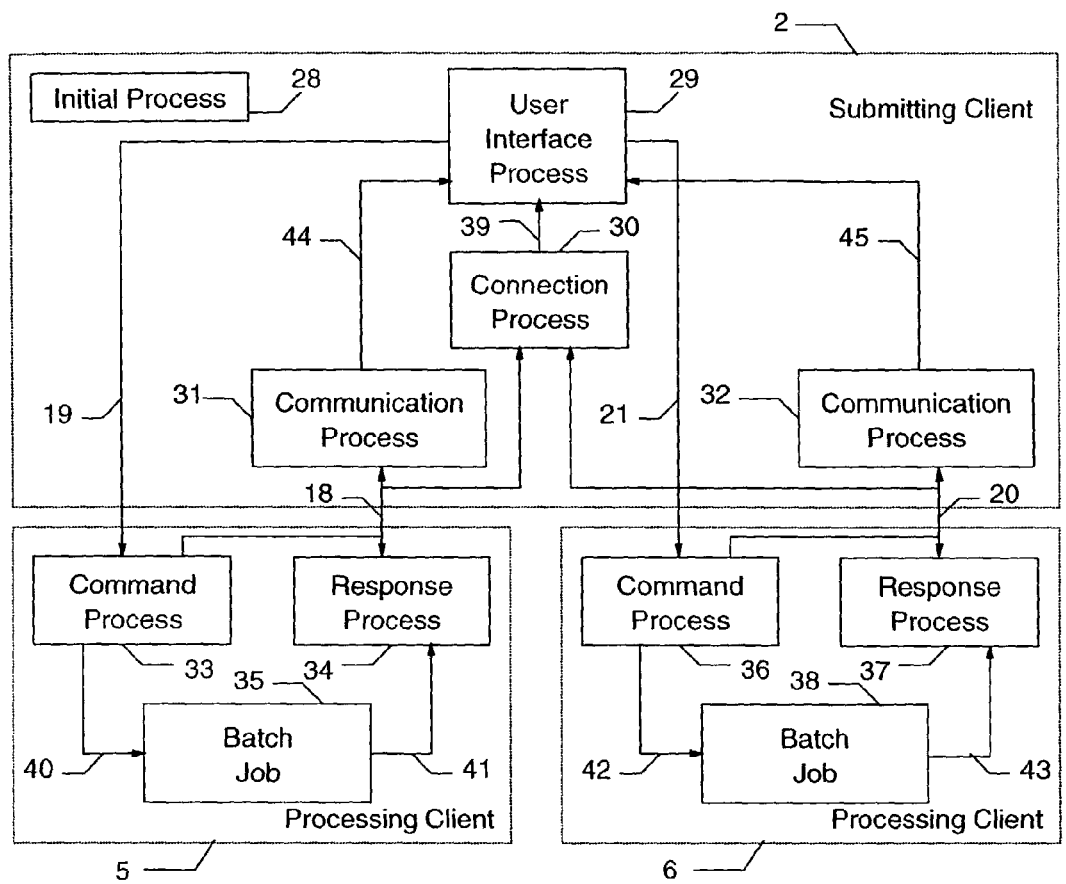
FIG. 3 illustrates the software layers (independent process threads) added on the submitting and processing clients to enable direct communication.

FIG. 3 illustrates the communications between submitting client 2, located in the upper portion of the figure, and processing clients 5 and 6, located in the lower portion of the figure, in greater detail. This figure shows the individual software process threads that together provide the communication services that are the subject of this invention.

To submit a multi-step batch job, a request is submitted by client 2 to the batch server 1. This request may be in the form of a control file, such as shown in FIG. 4. This control file is typical of prior art systems. This example control file specifies a 2 step job requiring 2 processing clients, but any number of job steps may be specified. Two clients would ordinarily be expected to process the 2 example steps in parallel (simultaneously). Lines 1 through 11 are the control information and parameters for the first job step, and lines 12 through 22 are the control information and parameters for the second job step.

To accomplish the monitoring and control disclosed by this invention, the request by client 2 to batch server 1 must be modified to cause the processing clients to start a monitoring process ahead of the actual batch job step. This is accomplished by modifying the control file of FIG. 4 as shown in FIG. 5. This file is modified at lines 6 and 17 for the two job steps, with the modifications highlighted for illustration purposes in a boldface font. The arguments specified in these lines of the control file specify the jobs to be run on the processing clients 5 and 6, respectively. Client 5 is instructed by this change to run monitoring process "llsim", with the remainder of this line containing the arguments to this program. These arguments include:

1) The name of the monitoring process 46, here "llsim", a program that must be available on the processing client.

2) The network name (host name) 47 of the submitter's system (client 2), assumed for this example to be client2.com.

3) The contact port 48 on the submitter's system (client 2) that will be used to receive communications from batch job steps, in this instance the embodiment's preferred TCP/IP port 49163.

4) An optional secret security key 49 used by processing clients to authenticate their access to the submitter's system for acceptance, shown as key0 in the example. This may be generated by various methods, including randomly, with each new job submission using a different key. This key, passed by centralized host 1 to processing clients 5 and 6, is used for access back to the submitting client 2. This insures that submitting client 2 accepts input from only those jobs that it launched.

5) The original arguments, beginning in this example with "psim" (the program name of the batch job step) followed by the arguments for this program.

The required modifications shown in FIG. 5 will be made on client 2 prior to submission of the request to the centralized server 1.

To begin the job submission process, the submitter, on client 2, invokes a program that will prepare to accept communications from the processing clients (these will be clients 5 and 6 in this example, but the identity of these clients is not yet known to the submitter), and that will submit the modified job requests to centralized server 1 for processing. In the present invention, the submitter invokes program "llsim", supplying as an argument the name of the control file shown in FIG. 4. Program "llsim", the same program that will be the monitoring process on processing clients, is able to determine whether it is running on a submitter's system (client 2 in this example) or a processing client (client 5 or 6 in this example), and take actions appropriate to its run environment. It determines this by examining the arguments supplied to the program. Alternate implementations could use different programs on the submitter's system and the processing clients.

When started by the submitter on client 2, the monitoring program "llsim" executes the following steps, and starts processes shown in FIG. 3:

1) The program prepares a table to hold the process ID of all child processes that it will create, so that it can terminate all said processes when the main process is terminated, and avoid leaving any zombie processes running. Each child process will be entered into the table as it is created in the following steps. The program also hooks into "kill", "quit", and similar events to terminate the processes in this table whenever the main program is ended.

2) The program determines that it is running on the submitter's system by examination of the program arguments, and follows the path for the submitter's system.

3) The program (initial process 28) forks a child process 29, and the parent exits. The child takes over as the new main process (this step is optional, but on some operating systems this makes the process a background process, and returns the user to a command prompt). The newly created process 29 will handle all interactions with the user.

4) User interface process 29 searches for a free communications port, and opens the selected port to listen for a connection from connection sub process 30 and communication sub processes 31, 32, and any additional communication sub processes that may be created. The port opened is 39 on the user interface process 29 in FIG. 3. If the preferred port is in use (possible if another instance of the program is already running) another port is chosen, and the background color of user interface windows will be changed to distinguish this instance from other instances.

5) User interface process 29 then forks a child process 30 for accepting connections from batch machines, and each continues with its own execution path. These two processes (independent process threads) establish a connection between themselves on communications link 39, possibly requiring use of a secret key generated before the sub processes are created, and shared with each new sub process as part of the fork process, for communications to be accepted.

6) Once communication link 39 is established, user interface process 29 prepares to communicate with the user to receive commands and display results. In the preferred embodiment, this interface consists of a graphical user interface, but other methods might also be utilized. This process is able to receive both user input from the graphical interface, and data from TCP/IP connections from other processes also running on the submitter's system. When the graphical user interface is exited, all sub processes on client 2 will be killed, and the monitoring process will be complete on the submitter's system 2. This may take place before or after all processing steps have completed on processing clients 5 and 6. If terminated early, no provision is made for reestablishing connection to the processing clients.

7) Connection process 30 opens another communications port for receiving connections from batch clients. This will be a separate port number, distinct from that created by user interface process 29, and will be used to receive new connections from processing clients. This port is shown at the bottom of connection process 30 in FIG. 3 (there is only one port, the two connections shown both connect to the same port).

8) Connection process 30 now reads the batch control file shown in FIG. 4, modifies it as shown in FIG. 5, and submits it to centralized server 1 for processing. The modifications include inserting the name of the monitoring process (the program's own name, "llsim"), the host name that it is running on (client2.com in this example), the communications port number opened in the previous step, and might also include a secret key or similar security device that processing clients must present to gain access to return results to the user interface process.

9) Connection process 30 sends selected information about the jobs just submitted back to user interface process 29. The user interface process uses this information to display the number of processing steps started, and to enable a cancel command to be sent to centralized server 1 for the job name returned when the command file was submitted, should the user want to cancel processing via the centralized server.

10) Centralized server 1 selects processing clients, and dispatches the processing steps to the selected clients 5 and 6.

11) Connection process 30 waits for a new connection from a processing client. Each time a new connection is received, connection process 30 forks another child process to handle the new connection.

12) On each processing client, for example 5, centralized server 1 initiates the program specified in the control file, in this case monitoring process "llsim", which starts as process 34 in FIG. 3. This process first determines that it is running on a processing client by examination of the arguments it receives, and follows the appropriate execution path. The first step taken is the opening of a communications port over which to communicate with submitting client 2. This connection is made to the host name and port number previously added to line 6 or 17 in FIG. 5 and supplied as program arguments to monitoring process "llsim" when processing client 5 is started by centralized server 1. The initial connection is made from response process 34 to connection process 30 over communication link 18. Depending on implementation, if a secret key was inserted in the modifications in FIG. 5, connection process 30 may require this secret key to be sent to validate the connection. Additional steps to make the connection secure may also optionally be undertaken, such as establishment of encryption of the link.

13) The first processing client connection to connection process 30 causes a fork, resulting in the creation of communication process 31. The next connection results in the creation of communication process 32, and if there are additional processing steps, additional similar communication process for each. Connection process 30 exists only to accept new connections and start these new communication processes. In addition, for each communication process created, a unique identity (the newly created process ID in the preferred embodiment) is sent back by connection process 30 to user interface process 29 over communication link 39. This identity will be used in each future communication from communication process 31, 32, etc. to identify which processing client messages originate from, so they can be attributed to the correct processing client.

14) With the fork in connection process 30, communication from response process 34 follows to the child process (communication process), and all future communications from the processing client 5 will be received by communication process 31. Communications link 18 will remain open and connected between response process 34 and communication process 31 until the batch job step 35 on processing client 5 completes.

15) At this time, response process 34 sends an initial self-identifying message to communication process 31, which will be forwarded and displayed to the user as an initial contact message. When communication process 31 receives this message, it forwards it over communications link 44 (a copy of link 39 that it inherited when it was forked from connection process 30—links shown as 39, 44, and 45 connect to the same receive port within user interface process 29). So that user interface 29 can determine which client this message is from, communication process 31 attaches its identity (the process ID in the preferred embodiment) to the message, and may also be required to include a secret key inherited from process 30 if established by processes 29 and 30. All future messages forwarded to user interface 29 by communications process 31 will also be tagged with this same identity. User interface process 29 displays the received message, attributed to a particular processing client step as identified by this identity.

16) Communication process 31 then sends information to necessary to identify itself and its user interface process to response process 34. These may include submitting client 2's identification such as its host name, or secret keys, that will be used later to validate commands from user interface 29 before they are accepted and processed by command process 33. This information is used to prevent the processing client 5 from accepting commands from any client other than the original submitter. Response process 34 saves this information to be passed to command process 33 when it is created.

17) Communication process 31 forwards any messages received from response process 34 to the user interface process 29. If the communication link is closed from the processing client end, communication process 31 reports this back to user interface process 29, which uses this information to inform the user that the processing step has completed. This detection of the communication link dropping allows the user to be informed that the processing step has completed, even if no message to this effect is received from the processing client (this may be a useful indication if the job on the processing client fails).

18) Response process 34 uses its remaining arguments (after removing the information that was added by connection process 30 and shown in FIG. 5 before submission to the centralized server 1) to start the job that was originally specified as the processing step in FIG. 4. The procedure for starting the job is described in the next steps.

19) Response process 34 starts the batch job 35, with input (usually STDIN) and output (usually STDOUT) connected to a bi-directional pipe (one that accepts bi-directional communication) so that input and output to and from the batch job are directed through the pipe to the response process 34. The input of the bi-directional pipe is represented as link 40 in FIG. 3, and the output as link 41.

20) Since one process cannot easily handle input from two sources (user interface process 29 via communication link 19, and the output of the batch job 35 via pipe 41), response process 34 forks a separate command process 33 to handle one communication path.

21) Command process 33 opens a new communications port over which to receive commands from user interface process 29. Command process 33 then sends contact information describing this new port over the previously established communications link 18, through communication process 31 and link 44 to user interface process 29 (command process 33 inherits a copy of the link 18 connection when it is forked from response process 34, and uses this connection once only to send this contact information before it starts listening for input from user interface process 29 over communications link 19). The contact information sent from command process 33 includes the processing client's host name, connection port number, and an optional secret key to be used to validate commands received on link 19. This information will be used by user interface 29 if the user chooses to send a command to the job step 35 executing on processing client 5. User interface process 29 may only complete connection 19 when it is necessary to send a command, and may close the connection after each command has been sent, reopening it if another command must be sent. User interface process 29 and command process 33 may also optionally choose to encrypt communications over link 19. Command process 33 will handle commands from the user via communications link 19 and forward them over pipe connection 40 to batch job 35.

22) Response process 34 handles output from the batch job 35 received over pipe connection 41 and forwards this output to communication process 31 over communications link 18.

23) Response process 34 will detect when batch process 35 has completed and closed the pipe connection. When this occurs, response process 34 will terminate command process 33, and then terminate itself, which will be seen by both communication process 31 and central server 1 as the completion of the batch step.

24) Steps 12 through 23 are repeated for each job step, creating unique processes for each. Communication process 32 and command process 36, response process 37, and batch job 38 represent the processes created for a second job step. Additional job steps will create additional similar processes (not shown).

User interface process 29 will provide a suitable user interface to allow 2-way interaction between the submitter and each of the job steps, for monitoring and controlling said steps. This interface may consist of multiple graphical interface windows in a form similar to those shown in FIGS. 6, 7, 8, and 9.

Figure 6:
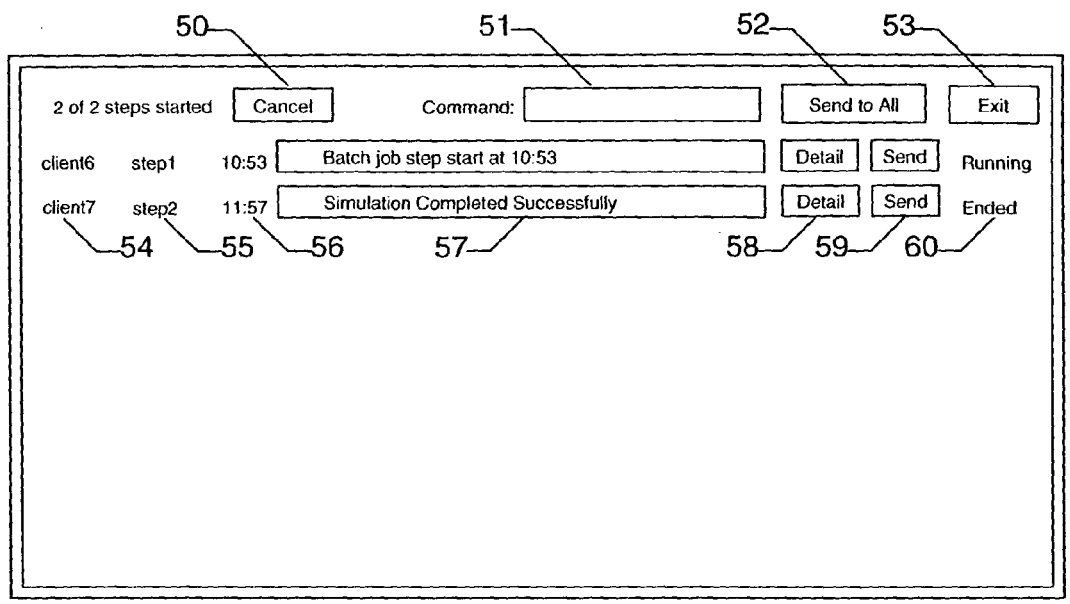
FIG. 6 illustrates a typical main user interface window.

FIG. 6 illustrates a possible implementation of the main monitoring process window displayed by user interface process 29. This interface includes a Cancel button 50, the only function provided that communicates with centralized server 1. This button provides a means for canceling all the job processing steps utilizing a command that centralized server 1 makes available for this purpose. All the remaining user interface controls are provided and serviced through the direct peer to peer connection (communication links 18, 19, 20, 21, 22, 23, 24, 25, 26, and 27) between submitting client 2 and processing clients 5 and 6 (or between submitting client 3 and processing clients 7 and 8, etc.).

The main user interface in FIG. 6 includes a command text entry window 51 for the user to enter commands that will be sent over a communications link, for example 19 or 21, to a command process, for example 33 or 36, from where it will be forwarded over pipe connection, for example 40 or 42 to batch job 35 or 38. This command will be sent to all active job steps 35 and 38 and any and all additional steps when the Send to All button 52 is pressed, or to one individual job step when the send button 59 corresponding to an individual job step is pressed.

The main user interface in FIG. 6 also displays a line of status corresponding to each job step. Information displayed may include the processing client name 54, the job step name 55 executing on that client, the time 56 of the last message from the job step, the last message 57 from the job step (the last line of output received from the job step via pipe connection 41 or 43, through response process 34 or 37, over communication link 18 or 20, through communication process 31 or 32, and over communication link 44 or 45 to user interface process 29, where it is displayed), and the current summary connection or completion status 60.

In addition, each job step in FIG. 6 includes a button 58 that allows additional information for the job step to be displayed. Pressing this button causes user interface process 29 to open an additional window. A possible implementation of this additional window is shown in FIG. 7.

Figure 7:
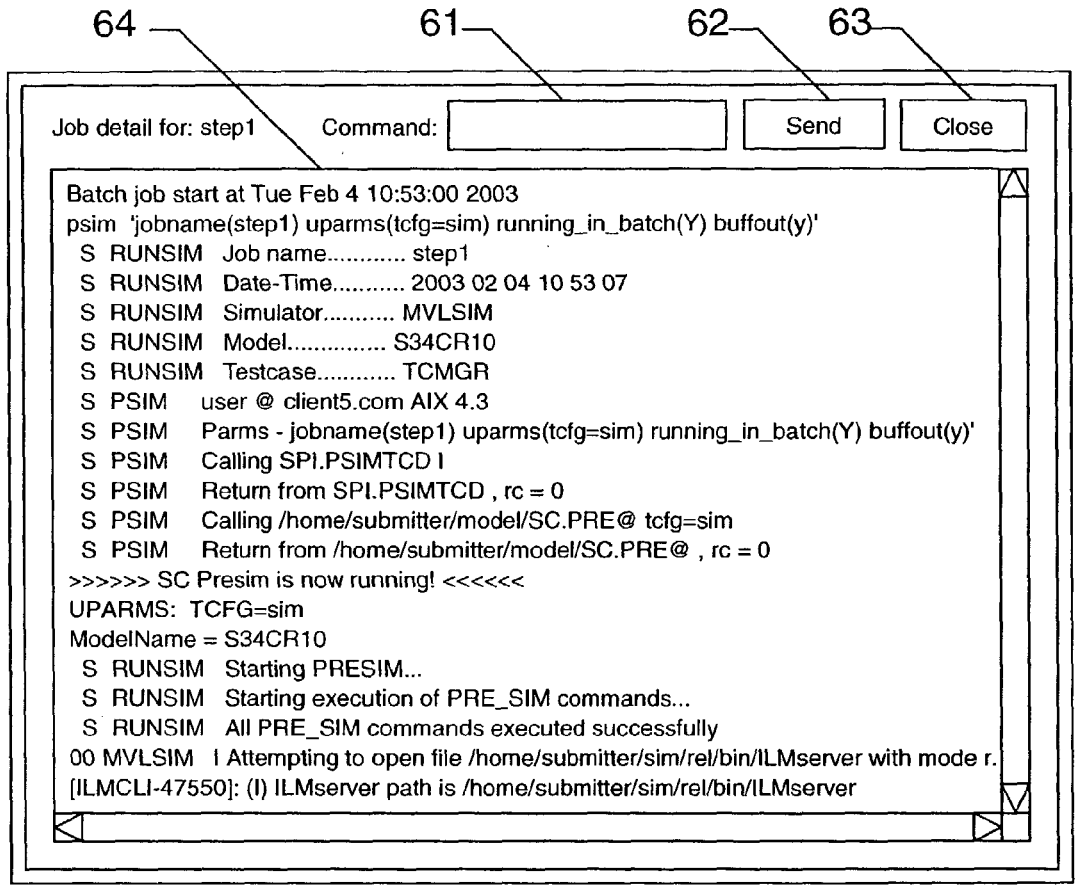
FIG. 7 illustrates a user interface sub-window for displaying more detail of the progress of one individual job step.
Figure 8:
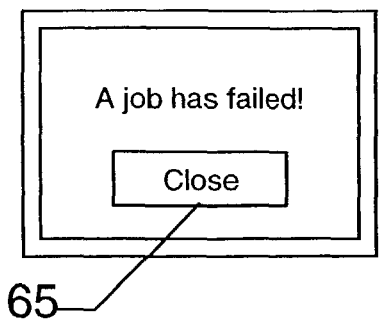
FIG. 8 illustrates an alert window to notify the submitter immediately of a failed job step.

The job detail window in FIG. 7 includes a command text entry window 61 and a corresponding send button 62. These perform the same function of sending a command to this one job step as command window 51 and send button 59 in the main user interface. The main function of this job detail window is to provide a complete display of all the output from the job step 64, rather than the most recent one line 57 displayed in the main user interface.

Figure 9:
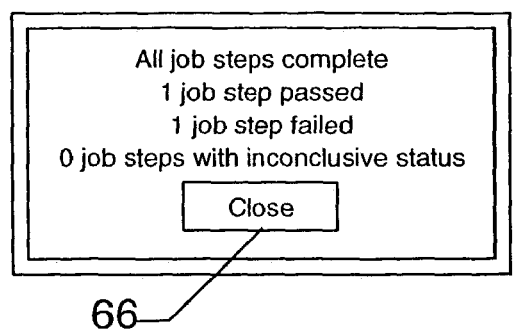
FIG. 9 illustrates an alert window to notify the submitter of the completion of all job steps, and to provide a concise summary of the results.

User interface process 29 may have additional functions customized to the particular application. These additional functions may be to recognize and react to the intermediate results of the job step as they are returned, prior to completion of the entire job step. Such customized functions may include recognizing and reporting success or failure or other characteristic, and keeping the status updated for the user as soon as it is known. Certain conditions may result in an immediate alert to the user, via an additional display window and alert sound, such as the job failure indication window shown in FIG. 8. At the conclusion of all job steps, user interface process 29 may open an additional informational window and sound an alert to notify the user of completion. An example of such a window is shown in FIG. 9.

The main user interface window has an Exit button 53 that closes all windows (such as those windows shown in FIGS. 6, 7, 8, and 9), closes all sub-processes such as 30, 31, and 32 on the submitting client 2, and finally terminates user interface process 29, ending all monitoring function on submitting client 2. Sub-windows (such as those shown in FIGS. 7, 8, and 9) have close buttons, for example 63, 65, and 66 that close only the sub-window without terminating any process or closing any other window.

Exiting the main interface window and the processes on the submitting client 2 does not terminate any process running on a processing client 5 or 6 or similar, however should this occur command and response processes, including 33, 34, 36, and 37 will no longer be able to communicate with submitting client 2. Command and response processes 33, 34, 36, and 37 should tolerate the drop of communication links to the submitting client 2 and allow the batch job step processes 35 and 38 to continue to completion without returning additional output to submitting client 2.

It will be seen that the disclosed computing system and application provides a solution for improved monitoring and control of jobs in grid and batch computing systems disclosed. In most grid computing systems a centralized manager, typically a single server, receives requests from a multitude of submitters, and prioritizes and initiates processing on a multitude of processing client systems. In this traditional method, the centralized server manages all communications with the plurality of submitter's systems, and the plurality of jobs running on the client systems, including transferring commands to client systems, and dissemination of results back to the submitters. This concentration of communications through a centralized server necessarily limits the scope and breadth of communications possible, particularly of detailed status of the progress of the batch processes on individual client systems, which might otherwise overload the centralized server with excessive communications traffic. With the disclosed method, a centralized batch manager is only responsible for workload balancing and job initiation and completion, all other command and status information are communicated directly between the plurality of submitter's systems and the plurality of client systems that are processing their respective workloads. This increased amount of feedback may not be appropriate for applications with a very large number of processing clients reporting to one submitting client because this feedback might also overload the submitting client, but for situations where immediate feedback is needed for monitoring, debug, or process modification, this method provides more control than possible via typical server-centric distributed processing systems. The disclosed implementation, utilizing event-driven peer to peer communications between the submitter's systems and client systems, enables more detailed status and control information to be passed without overloading the centralized server, and by avoiding polling, also provides more immediate feedback of results. The disclosed system utilizes multiple process threads on both the submitter's and client systems, and provides for a user interface to consolidate and display results to the submitter, and to allow commands to be sent to the running processes on the client batch systems.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer system comprising:
   a centralized server having overall control of a batch or grid computing system for receiving and dispatching requests from a submitter computer to an available processing computer, said processing computer being selected by said centralized server; and
   means for communicating a batch job request from the submitter computer to the processing computer via the centralized server for processing by the processing computer, said batch job request identifying a monitoring process;
   wherein the monitoring process is executed at the submitter computer and the processing computer, the monitoring process establishing a communication link between the submitter computer and the processing computer without participation by the centralized server, the monitoring process being configured to communicate a processing status of the batch job request via said communication link;
   wherein said centralized server is only responsible for workload balancing and job initiation and completion while other command and status information is communicated directly between the submitter computer and the processing computer that are processing their respective workloads; and
   wherein the submitter computer and the processing computer use event-driven peer to peer communications between each other such that detailed status and control information is passed without overloading the centralized server and without polling.

2. The computer system according to claim 1, further comprising a connection process on said submitter computer for receiving new direct connections from said processing computer whose identity is not known in advance and authenticating said processing computer via a key sent initially through the centralized server and returned via said communication link.

3. The computer system according to claim 1, wherein said batch job request includes at least one key to allow the submitter computer and the processing computer to positively identify each other and exclude communications from other computers in said computer system.

4. The computer system of claim 1, further comprising:
   multiple process threads employed on the submitter computer and the processing computer to enable simultaneous bidirectional peer to peer communication between the submitter computer and the processing computer; and
   a user interface for consolidating and displaying results of the batch job request to said submitter computer and for allowing commands to be sent to processes running on said processing computer.

5. A computer system, as claimed in claim 1, wherein the batch job request includes instructions as to how and where to connect to the submitter computer by the processing computer.

6. A computer system, as claimed in claim 1, further comprising a user interface at the submitter computer, said user interface simultaneously receiving and displaying a summary of input from the processing computer and enabling sending commands to said processing computer.

7. A computer system, as claimed in claim 6, wherein said user interface enables display of additional informational windows displaying additional details of communications with a job step on said processing computer.

8. A computer system, as claimed in claim 6, wherein said user interface receives from said processing computer the processing status and presents the submitter computer a summary of said processing status.

9. A computer system, as claimed in claim 1, further comprising a user interface process on said submitter computer enabling one or more of different instances of said user interface process that may exist on said submitter computer to detect e preferred communication port already in use, select another available communications port, and change a visible characteristic of said user interface.

10. A computer system as claimed in claim 1, further comprising: a response process established on said processing computer for receiving results from said batch job request on said processing computer and forwarding the received results over e said communication link to said submitter computer for display and analysis.

11. A computer system as claimed in claim 1, further comprising: a command process established on said processing computer for receiving commands from a user interface process on said submitter computer and forwarding the received commands from said user interface process on said submitter computer via said communication link to said processing computer.

* * * * *